US012573154B1

(12) United States Patent
Ewers et al.

(10) Patent No.: US 12,573,154 B1
(45) Date of Patent: Mar. 10, 2026

(54) AUGMENTED VIDEO BASED ON USER ACTIVITY

(71) Applicant: Apple Inc., Cupertino, CA (US)

(72) Inventors: Paul Ewers, San Jose, CA (US); Richard P. Lozada, Cupertino, CA (US); Peter Burgner, Venice, CA (US); Thomas J. Moore, Northglenn, CO (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 18/368,954

(22) Filed: Sep. 15, 2023

Related U.S. Application Data

(60) Provisional application No. 63/409,119, filed on Sep. 22, 2022.

(51) Int. Cl.
| | |
|---|---|
| *G06T 19/00* | (2011.01) |
| *G06F 3/01* | (2006.01) |
| *G06T 7/70* | (2017.01) |
| *G06V 20/20* | (2022.01) |
| *G06V 20/40* | (2022.01) |
| *G06V 40/20* | (2022.01) |

(52) U.S. Cl.
CPC ............ *G06T 19/006* (2013.01); *G06F 3/013* (2013.01); *G06T 7/70* (2017.01); *G06V 20/20* (2022.01); *G06V 20/40* (2022.01); *G06V 40/23* (2022.01)

(58) Field of Classification Search
CPC ......... G06T 19/006; G06T 7/70; G06F 3/013; G06V 20/20; G06V 20/40; G06V 40/23
See application file for complete search history.

(56) References Cited

U.S. PATENT DOCUMENTS

| | | | |
|---|---|---|---|
| 10,180,572 B2 | 1/2019 | Osterhout et al. | |
| 2016/0037213 A1* | 2/2016 | Collins | .............. H04N 21/4126 |
| | | | 725/10 |
| 2020/0195940 A1* | 6/2020 | Noorkami | .......... G02B 27/0093 |
| 2021/0065407 A1* | 3/2021 | Trim | ...................... G06V 10/44 |
| 2021/0204031 A1* | 7/2021 | VanSickel | .......... H04N 21/4828 |
| 2023/0316662 A1* | 10/2023 | Singh | ................. G06Q 30/0277 |
| | | | 345/633 |

FOREIGN PATENT DOCUMENTS

| | | | |
|---|---|---|---|
| CN | 103974107 A | * | 8/2014 |

OTHER PUBLICATIONS

Annotation Links: A Polite Marketer's Best Friend, Wistia Blog. 5 pages.
Mento, Neurotechnology, Different Kinds of Eye Tracking Devices, Jun. 2020. 11 pages.

* cited by examiner

*Primary Examiner* — Jeffery A Brier
(74) *Attorney, Agent, or Firm* — Thompson Hine LLP

(57) ABSTRACT

Various implementations that use user activity determined via a first device (e.g., an HMD, tablet, etc.) to provide augmentations corresponding to video content (e.g., a TV show, movie, etc.) that is being presented on a second device (e.g., a TV, monitor, etc.). The first device (e.g., HMD) detects that a user activity (e.g., a user's gaze, gesture, interest) is directed to a portion of a surface corresponding to a video content viewing area provided by the second device (e.g., the TV, monitor, etc.). An element of the video content currently being displayed at that portion of the surface by the second device is identified and used to provide an augmentation that is displayed by the first or second device.

24 Claims, 4 Drawing Sheets

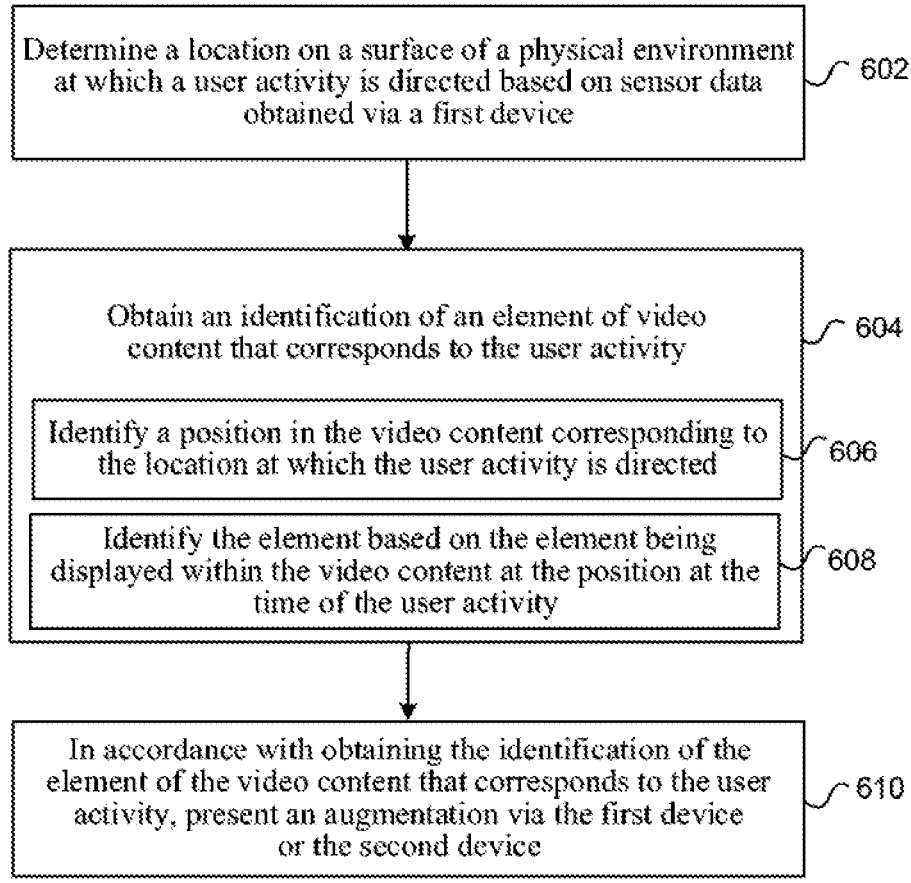

600

Determine a location on a surface of a physical environment at which a user activity is directed based on sensor data obtained via a first device — 602

Obtain an identification of an element of video content that corresponds to the user activity — 604

Identify a position in the video content corresponding to the location at which the user activity is directed — 606

Identify the element based on the element being displayed within the video content at the position at the time of the user activity — 608

In accordance with obtaining the identification of the element of the video content that corresponds to the user activity, present an augmentation via the first device or the second device — 610

FIG. 6

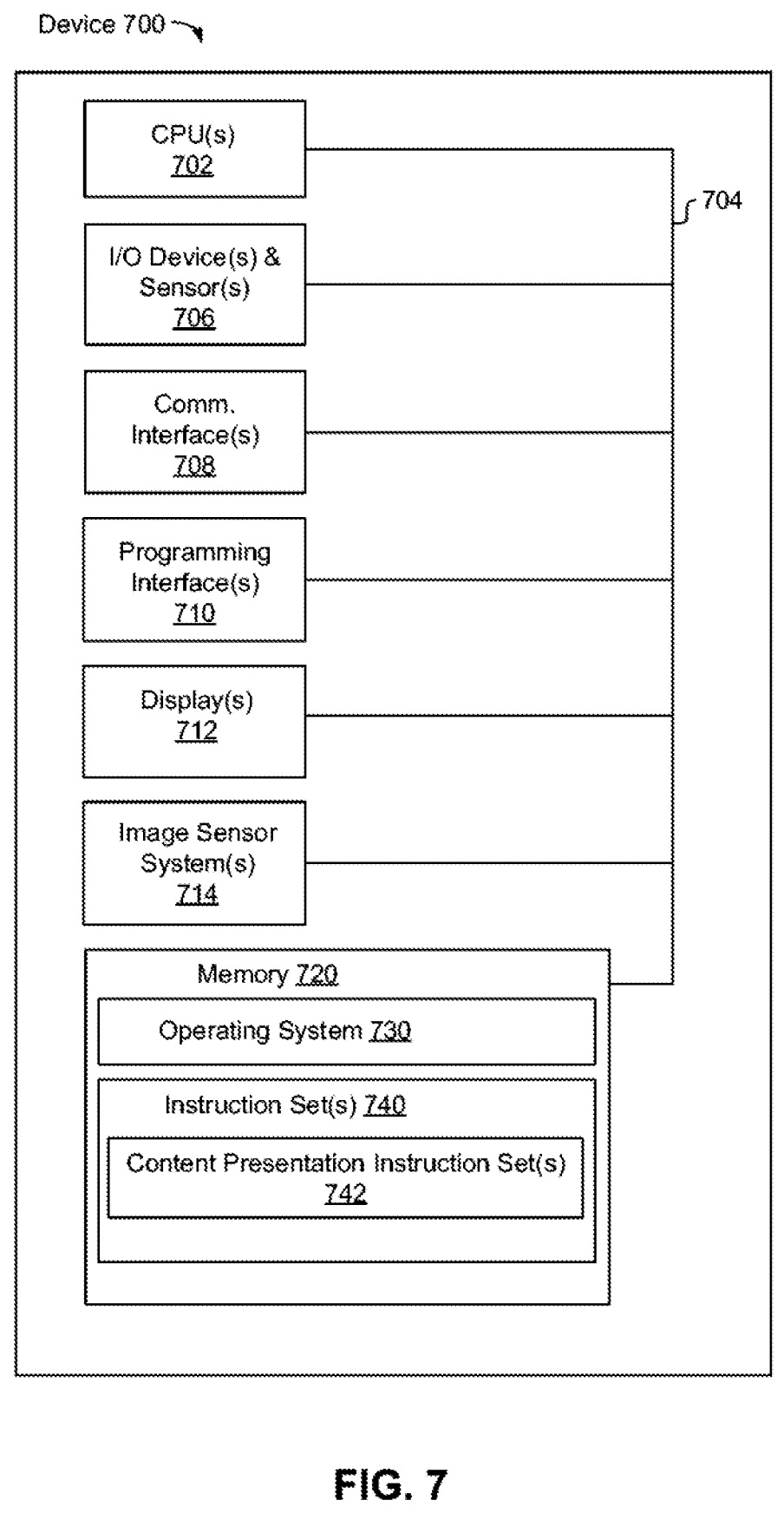

Device 700

CPU(s)
702

I/O Device(s) &
Sensor(s)
706

Comm.
Interface(s)
708

Programming
Interface(s)
710

Display(s)
712

Image Sensor
System(s)
714

704

Memory 720

Operating System 730

Instruction Set(s) 740

Content Presentation Instruction Set(s)
742

FIG. 7

AUGMENTED VIDEO BASED ON USER ACTIVITY

CROSS-REFERENCE TO RELATED APPLICATIONS

This Application claims the benefit of U.S. Provisional Application Ser. No. 63/409,119 filed Sep. 22, 2022, which is incorporated herein in its entirety.

TECHNICAL FIELD

The present disclosure generally relates to systems, methods, and devices that present media content, such as video content, within a three-dimensional (3D) environment.

BACKGROUND

Electronic devices are used to present video content but may not adequately provide supplemental content corresponding to the video content and the elements presented within the video content.

SUMMARY

Various implementations disclosed herein include devices, systems, and methods that use user activity determined via a first device (e.g., an HMD, tablet, etc.) to provide augmentations corresponding to video content (e.g., a TV show, movie, etc.) that is being presented on a second device (e.g., a TV, monitor, etc.). The first device (e.g., HMD) detects that a user activity (e.g., a user's gaze, gesture, interest) is directed to a portion of a surface corresponding to a video content viewing area provided by the second device (e.g., the TV, monitor, etc.). An element of the video content currently being displayed at that portion of the surface by the second device is identified and used to provide an augmentation that is displayed by the first or second device. For example, an HMD may determine that the user is gazing at a point on a surface (e.g., an x/y coordinates-based position on a TV surface) corresponding to a foot of a professional soccer player in content that the TV is displaying on that surface. This gazing or other input may be used to determine that the user has an interest in that player or that player's shoe and augmented content provided accordingly. For example, the HMD or TV may present content that provides an augmentation that identifies the brand and model of the shoe.

In some implementations a device has a processor (e.g., one or more processors) that execute instructions stored in a non-transitory computer-readable medium to perform a method. The method determines a location on a surface of a physical environment at which a user activity is directed based on sensor data obtained via a first device. In some implementations this involve identifying the boundaries or region of a surface corresponding to a display such as a television and identifying a location, e.g., coordinates within the plane of that surface that correspond to a user activity. In one example, this involves determining that the user is looking at a particular portion or coordinate location. In another example, this involves determining that the user is pointing or otherwise gesturing towards a particular portion or coordinate location. In another example, the location on the surface is determined based on verbal input, e.g., interpreting a phrase "what is that golfer wearing" to identify that a golfer (in the displayed content) is the subject of interest and determining a location of that displayed golfer (e.g., based on gaze data or information about the video content) relative to the surface of the physical environment. In some implementations, the surface of the physical environment is identified based on detecting a flat/planar area and an indicator (e.g., a dot pattern displayed in TV content) that indicates the position, screen size, boundaries, or other attributes of where and how the video content is being displayed.

The method obtains an identification of an element of video content that corresponds to the user activity. The element may be displayed by a second device such a TV, monitor, electronic billboard, tablet, mobile phoned, etc., separate from the first device in the physical environment. The element is identified based on data indicating that the element is displayed within the video content at the time of the user activity and at a position corresponding to the location on the surface of the physical environment at which the user activity is directed. The method may determine that the element corresponds to the user activity based on data (e.g., metadata in or associated with the video content) identifying that the element is displayed within the video content at a position at the time of the user activity. The method may determine that the element corresponds to the user activity based on determining that the position at which the element is displayed corresponds to the location on the surface of the physical environment at which the user activity is directed. For example, this may involve determining there is a shoe displayed in the video content at which the user is looking or gesturing and that the shoe is brand B1 model M1. The data identifying where the element is displayed within the video content may be determined automatically or manually. For example, such data may be generated when the content was created by the content creator or a $3^{rd}$ party interested in identifying their elements in the video content. In another example, such data may be generated based on a inspecting the video content, for example, at an inspection server operated by a streaming media provider. Such a later inspection may occur days, weeks, months, etc. after content creation or at, or just before, the time of streaming/playback of the video content.

In accordance with obtaining the identification of the element of the video content that corresponds to the user activity, an augmentation is presented via the first device or the second device. For example, the second device, e.g., a TV, may have augmented content overlaid on the displayed content. In another example, the first device, e.g., an HMD, may display augmentations on or near a depiction of the first device (e.g., the TV). The positioning of the augmentation may be based on the location at which a user activity is directed or the position in the video content at which the element is displayed. For example, the first device, e.g., an HMD may receive data identifying where on the surface the element is displayed and position the augmentation accordingly, e.g., nearby, with an arrow pointing to the element, etc.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative imple- mentations, some of which are shown in the accompanying drawings.

FIG. 6 illustrates a method that uses user activity deter- mined via a first device to provide augmentations corre- sponding to video content that is being presented on a second device, in accordance with some implementations.

FIG. 7 illustrates an exemplary device configuration in accordance with some implementations.

Figure 1:
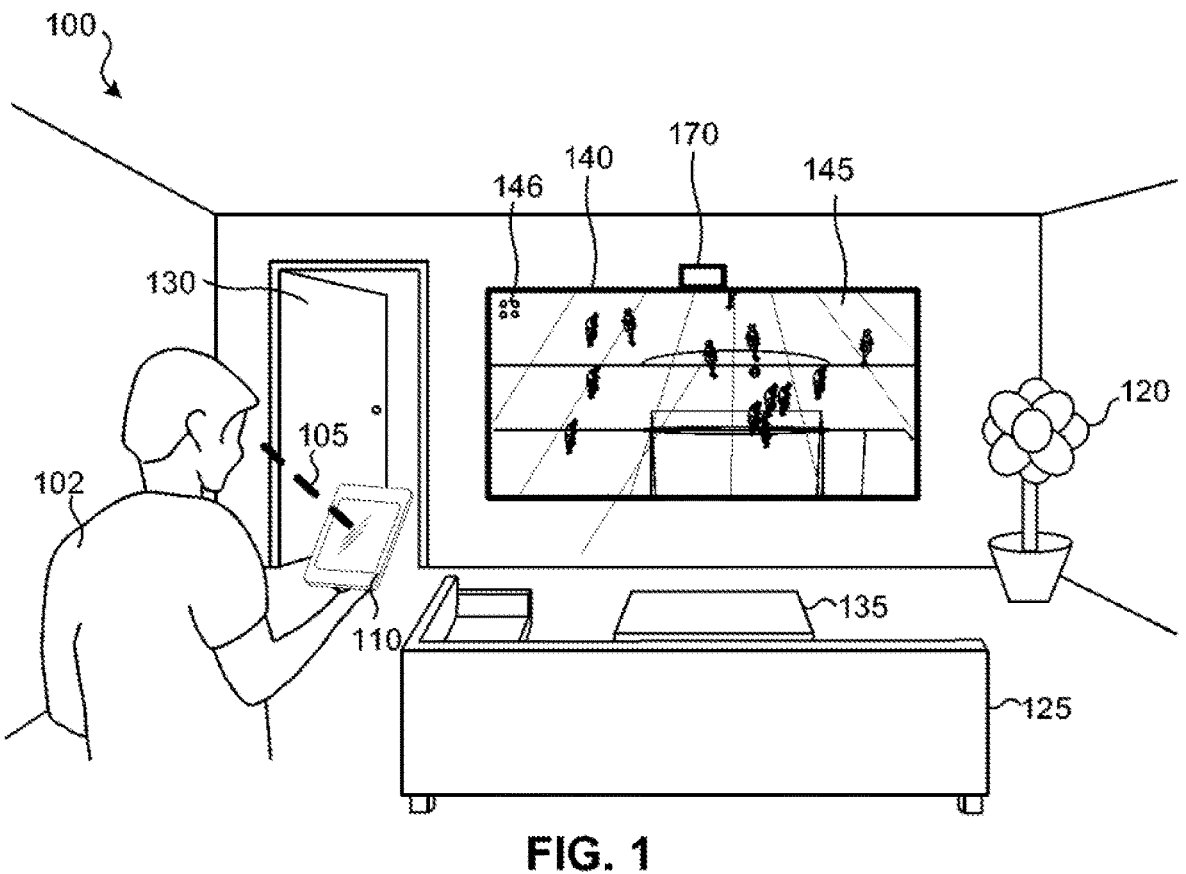
FIG. 1 is an example physical environment in which one or more devices may be used in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an example physical environment 100 in which a device, such as device 110, may provide views in accordance with some implementations. In this example, physical environment 100 includes walls, a potted plant 120, a sofa 125, a door 130, a table 135, a TV 140 displaying video content 145, and a streaming device 170. The stream- ing device 170 streams video content 145 that it receives from a remote video streaming service for display on the TV 140.

The electronic device 110 may include one or more cameras, microphones, depth sensors, or other sensors that can be used to capture information about and evaluate the physical environments 100 and the objects therein, as well as information about the user 102. The device 110 may use information about its physical environment 100 or user 102 that it obtains from its sensors to provide visual and audio content. For example, such information may be used to determine that the user 102 is looking at a portion of the video content 145 that is displayed by the TV 140.

In some implementations, the device 110 is configured to present views that it generates to the user 102, including views that may be based on the physical environment 100. In some implementations, such views include or are based upon pass-through video captured by the device 110, e.g., video that of environment 100 that device 110 captures and simultaneously displays to provide a live view of the physi- cal environment 100. In some implementations, the device 110 includes an optical see-through portion through which the physical environment 100 may be seen and to which augmented content may be added.

In some implementations, the device 110 displays or otherwise provides views of the physical environment 100 and tracks at which portion of the provided view of the physical environment the user's gaze 105 is directed. In some implementations, the device 110 tracks user activity (e.g., gaze-based input, gesture-based input, verbal input, indications of attention or interest, etc.) while the device 110 provides views of the physical environment and associates the tracked user activity with video content 145 (or a portion of the video content 145) being provided on TV 140. Augmentations to the video content 145 may be selected, positioned, or otherwise provided by the device 110 or the TV 140 based on associating the tracked user activity with the video content 145 (or a portion of the video content 145). FIGS. 2-5, discussed below, illustrate augmentations pro- vided based on tracking a user activity.

In some implementations, the device 110 is a handheld electronic device (e.g., a smartphone or a tablet). In some implementations, the user 102 wears the device 110 on his/her head. As such, the device 110 may include one or more displays provided to display content. The device 110 may enclose the field-of-view of the user 102.

In some implementations, the functionalities of device 110 are provided by more than one device. In some imple- mentations, the device 110 communicates with a separate controller or server to manage and coordinate an experience for the user. Such a controller or server may be local or remote relative to the physical environment 100.

FIGS. 2-5 are views depicting the physical environment of FIG. 1 with augmentations provided in accordance with various implementations.

Figure 2:
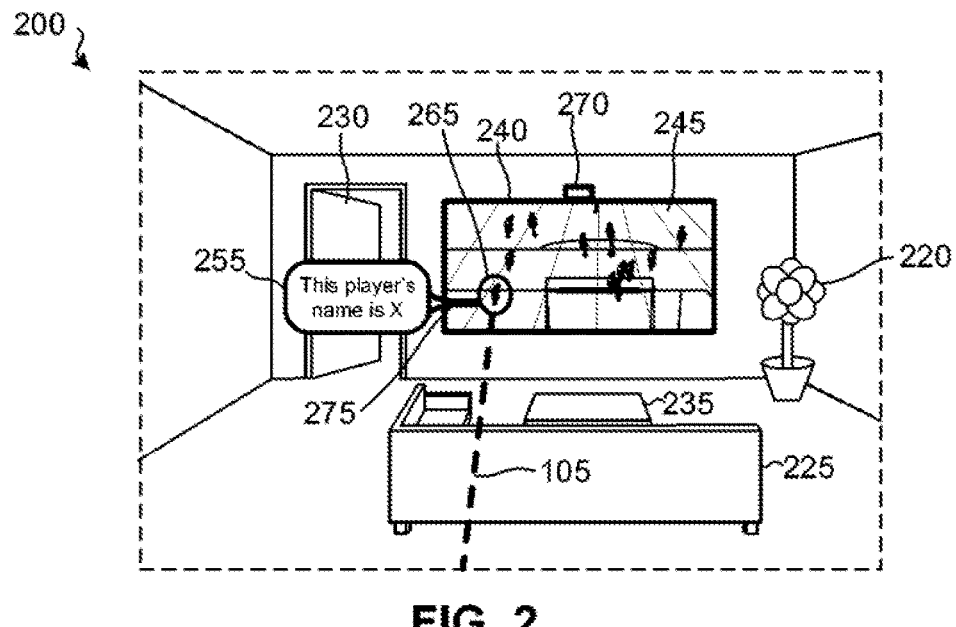
FIGS. 2-5 are views depicting the physical environment of FIG. 1 with augmentations, in accordance with some implementations.

FIG. 2 is a view 200 depicting the physical environment 100 provided by the device 110 of FIG. 1. In this example, the view 200 is a view of an XR environment that depicts and enables user interactions with real or virtual objects. Such a view may include optical see through or pass-through video providing depictions of portions of the physical envi- ronment 100. In one example, one or more outward facing cameras on device 110 capture images of the physical environment that are passed through to provide at least some of the content depicted in the view 200. In this example, the view 200 includes depictions of the walls, depictions of the floor and ceiling, a depiction 220 of the potted plant 120, a depiction 225 of the sofa 125, a depiction 230 of the door 130, a depiction 235 of the table 135, a depiction 240 of the TV 140 including depiction 245 of the video content 145, and a depiction 270 of the streaming device 170.

In this example, the device 110 identifies a portion of the depicted 3D environment (e.g., of physical environment 100) that corresponds to the TV 240. For example, image and depth sensor data may be obtained by one or more sensors on the device 110 and used to generate a semantic segmentation of the physical environment or identify sur- faces (e.g., planar surfaces, flat, curved surfaces, etc.) within the physical environment. In some implementations, an image captured by a sensor of the device 110 is analyzed to identify a 3D position of a screen or monitor capable of displaying video content. For example, one or more images may be interpreted to identify such a screen/monitor via an algorithm or machine learning model trained to identify TV screens, monitors, tablet displays, or other surfaces of content displaying devices.

In some implementations, the device 110 identifies a pattern in displayed content on the other device, e.g., pattern 146 in video content 145 (shown in FIG. 1), and interprets that pattern to determine the 3D position of a screen/monitor capable of displaying content. In some implementations, such a pattern includes information that provide the size, dimensions, boundaries, or other characteristics of a screen/monitor capable of displaying content.

In some implementations, the device 110 identifies the 3D position of a screen/monitor capable of displaying content based on information provided by another device. For example, the TV 140 or streaming device 170 may store information about the dimensions of the screen/monitor (e.g., 65" diagonal screen) and provide this information to device 110, for example, via inter-device communications. In some implementations, the device 110 and the other device (e.g., TV 140 or streaming device 170) are associated with the same user account and are configured to share information with one another in circumstances (such as those depicted in FIG. 2) in which the devices are being used at the same time or in the same environment.

The device 110 also monitors for user activity related to content displayed on the TV 140 (e.g., relative to the depiction 245 of the video content 145). In this example, the device 110 determines that the gaze 105 of the user 102 is directed at a location on the depiction 240 of the TV 240. This location is used (e.g., by device 110, TV 140, streaming device 170, or another device) to determine an element of the video content that is currently being displayed at that location, e.g., a particular soccer player. The video content may include or be associated with data (e.g., metadata) that facilitates such a determination. For example, such data may identify the x/y display positions of particular elements (e.g., players, balls, lines, goals, fans, billboards, etc.) that are displayed in each frame of the video content. In some implementations, an element's position is represented by a center point and radius representing the approximate size of the element. In some implementations, an element's position is represented by bounding box coordinates. Other formats may of course be used.

The device 110 may monitor for activity that is indicative of interest by user 102 in the video content 145 in general or in particular portions/elements of the video content 145. In this example, the user's gaze 105 being directed at location 265 is interpreted as an indication that the user 102 is interested in whatever element is displayed at that location 265 or, if no element is displayed at that location, that the user is interested in the video content 145 generally. In this example, an element (e.g., a particular soccer player) is displayed at that location 265. The determination that the user is interested in this element is used to provide an augmentation 255 which, in this example, is a text bubble that provides information about the element "This player's name is X."

The augmentation 255 is positioned based on the location 265. Specifically, the 3D position of the surface is known and the x/y position of the element on that surface is known—providing the 3D position where the element (e.g., player) is displayed within the 3D environment depicted in view 200. In this case, the augmentation is displayed on a side of the depiction 240 of the TV 140. The left side is selected based on determining that the element (e.g., the player) is near the left side of the TV 240. This positions the augmentation 255 closer to the element than it would be on the right side of the TV.

In addition, an association augmentation 275 is also provided to provide a visual/graphical link pointing from the representation 255 (e.g., the text bubble) to and then encircling and highlighting the element (e.g., the depiction of the player) in the depiction 245 of the video content 145.

Figures 3, 4, 5:
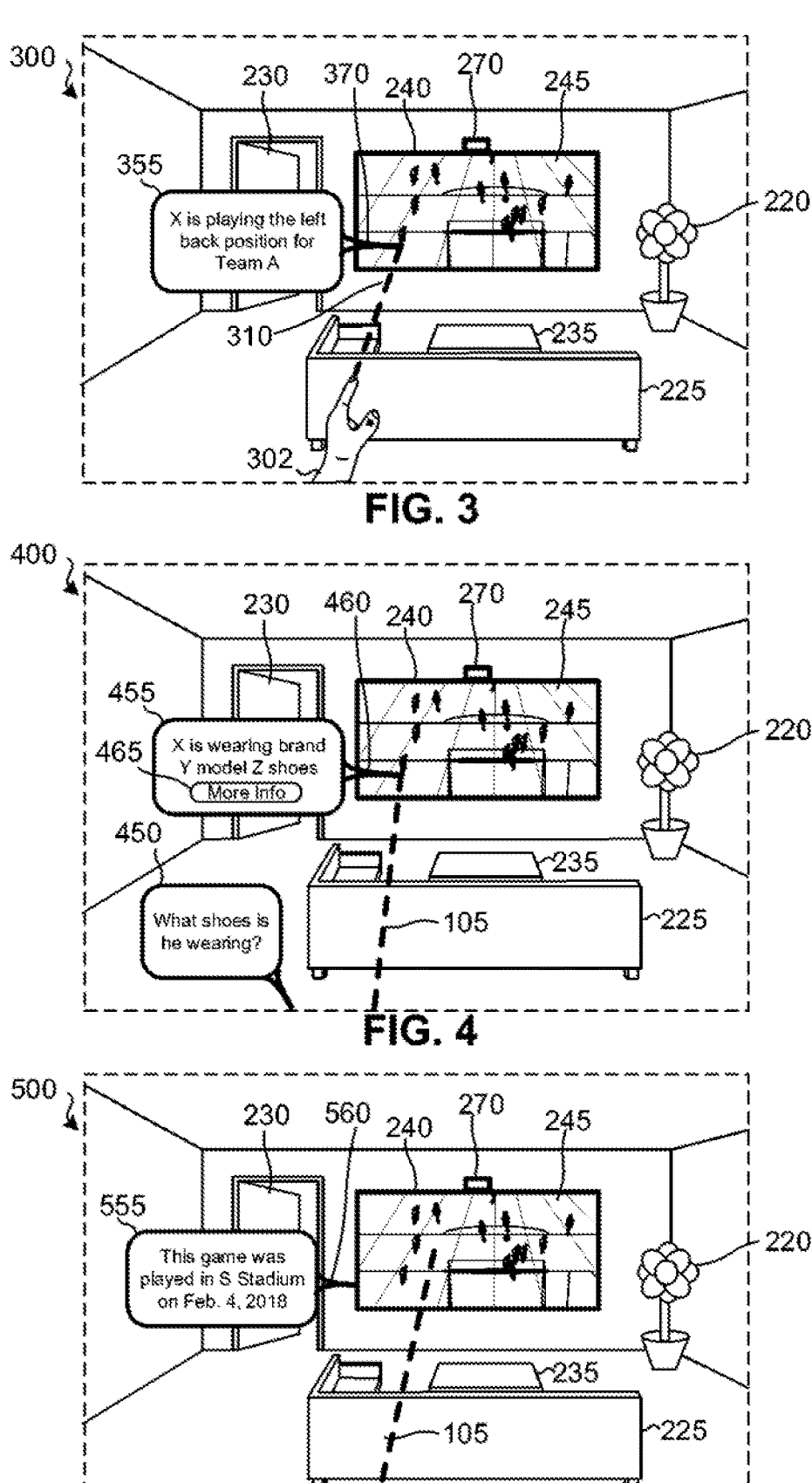

Similar to FIG. 2, FIG. 3 also is a view 300 depicting the physical environment 100 provided by the device 110 of FIG. 1. In this example, the view 300 includes depictions of the walls, depictions of the floor and ceiling, a depiction 220 of the potted plant 120, a depiction 225 of the sofa 125, a depiction 230 of the door 130, a depiction 235 of the table 135, a depiction 270 of the streaming device 170, and a depiction 240 of the TV 140 including depiction 245 of the video content 145.

As in the example of FIG. 2, the device 110 identifies a portion of the depicted 3D environment (e.g., of physical environment 100) that corresponds to the TV 240. The device 110 may identify the 3D position of a screen/monitor capable of displaying content based on information provided by another device, e.g., TV 140 or streaming device 170.

The device 110 also monitors for user activity related to content displayed on the TV 140 (e.g., relative to the depiction 245 of the video content 145). In this example, the device 110 determines that a hand 302 of the user 102 is pointing in a direction 310 towards a location on the depiction 240 of the TV 240. This location is used (e.g., by device 110, TV 140, streaming device 170, or another device) to determine an element of the video content that is currently being displayed at that location, e.g., a particular soccer player. The video content may include or be associated with data (e.g., metadata) that facilitates such a determination.

The device 110 may monitor for activity that is indicative of interest by user 102 in the video content 145 in general or in particular portions/elements of the video content 145. In this example, the user's hand 302 pointing towards a location is interpreted as an indication that the user 102 is interested in whatever element is displayed at that location or, if no element is displayed at that location, that the user is interested in the video content generally 145. In this example, an element (e.g., a particular soccer player) is displayed at that location. The determination that the user is interested in this element is used to provide an augmentation 355 which, in this example, is a text bubble that provides information about the element "X is playing the left back position for Team A."

The augmentation 355 is positioned based on the location at which the user activity (e.g., pointing) was directed. The augmentation 355 is displayed on a side of the depiction 240 of the TV 140. The left side is selected based on determining that element (e.g., the player) is near the left side of the TV 240. This positions the augmentation 355 closer to the element than it would be on the right side of the TV. In addition, an association augmentation 370 is also provided to provide a visual/graphical link pointing from the representation 355 (e.g., the text bubble) to the element (e.g., the depiction of the player) in the depiction 245 of the video content 145.

Similar to FIGS. 2 and 3, FIG. 4 also is a view 400 depicting the physical environment 100 provided by the device 110 of FIG. 1. In this example, the view 400 includes depictions of the walls, depictions of the floor and ceiling, a depiction 220 of the potted plant 120, a depiction 225 of the sofa 125, a depiction 230 of the door 130, a depiction 235 of the table 135, a depiction 270 of the streaming device 170, and a depiction 240 of the TV 140 including depiction 245 of the video content 145.

As in the examples of FIGS. 2-3, the device 110 identifies a portion of the depicted 3D environment (e.g., of physical environment 100) that corresponds to the TV 240. The device 110 may identify the 3D position of a screen/monitor capable of displaying content based on information provided by another device, e.g., TV 140 or streaming device 170.

The device 110 also monitors for user activity related to content displayed on the TV 140 (e.g., relative to the depiction 245 of the video content 145). In this example, the device 110 determines that a gaze 105 of the user 102 is directed towards a location on the depiction 240 of the TV 140. The device 110 also captures audio and determines that the audio includes a verbal phrase 450 provided by the user 102: "What shoes is he wearing." The location that is identified based on the gaze 105 is used (e.g., by device 110, TV 140, streaming device 170, or another device) to determine an element of the video content that is currently being displayed at that location, e.g., a particular soccer player, to which the verbal phrase relates. In other words, based on determining that the user 102 is gazing at a depiction of the particular soccer player, a device determines that the "he" in the verbal phrase 450: "What shoes is he wearing?" refers to that soccer player. The device than determines an appropriate response/augmentation based on this contextual understanding. The video content may include or be associated with data (e.g., metadata) that facilitates such determinations.

The device 110 may monitor for activity that is indicative of interest by user 102 in the video content 145 in general or in particular portions/elements of the video content 145. In this example, the user's gaze 105 and verbal phrase 450 are interpreted as an indication that the user 102 is interested in what shoes are being worn by a person at that location. This determination is used to provide an augmentation 455 which, in this example, is a text bubble that provides information responsive to the verbal phrase 450. The augmentation includes the text: "X is wearing brand Y model Z shoes" and provides a selectable option 465 for obtaining more information. The additional information available through such an option may include information from external sources, e.g., encyclopedia webpages, soccer-focused webpages, shopping web resources usable to shop for the identified shoes, etc.

The augmentation 455 is positioned based on the location at which the user activity (e.g., pointing) was directed. The augmentation 455 is displayed on a side of the depiction 240 of the TV 140. The left side is selected based on determining that element (e.g., the player) is near the left side of the TV 240. This positions the augmentation 455 closer to the element than it would be on the right side of the TV. In addition, an association augmentation 460 is also provided to provide a visual/graphical link pointing from the representation 455 (e.g., the text bubble) to the element (e.g., the depiction of the player) in the depiction 245 of the video content 145.

Similar to FIGS. 2-4, FIG. 5 also is a view 500 depicting the physical environment 100 provided by the device 110 of FIG. 1. In this example, the view 500 includes depictions of the walls, depictions of the floor and ceiling, a depiction 220 of the potted plant 120, a depiction 225 of the sofa 125, a depiction 230 of the door 130, a depiction 235 of the table 135, a depiction 270 of the streaming device 170, and a depiction 240 of the TV 140 including depiction 245 of the video content 145.

As in the examples of FIGS. 2-4, the device 110 identifies a portion of the depicted 3D environment (e.g., of physical environment 100) that corresponds to the TV 240. The device 110 may identify the 3D position of a screen/monitor capable of displaying content based on information provided by another device, e.g., TV 140 or streaming device 170.

The device 110 also monitors for user activity related to content displayed on the TV 140 (e.g., relative to the depiction 245 of the video content 145). In this example, the device 110 determines that a gaze 105 of the user 102 is directed towards a location on the depiction 240 of the TV 140. The location that is identified based on the gaze 105 is used (e.g., by device 110, TV 140, streaming device 170, or another device) to determine the user is not directing attention or interest to a particular element but rather looking around the content or looking at a portion of the video content that is not associated with any particular information from which an augmentation may be identified. In some implementations, a time threshold is used to determine whether the user is focusing attention or interest on a particular element or watching the content generally. For example, a user is only determined to be gazing at an element if the gaze lasts more than a threshold amount of time. In some implementations, secondary input (e.g., the verbal phrase 450 of FIG. 4) is used to distinguish between the user 102 directing attention/interest to a particular element versus the user directing attention/interest to the video content 145 generally.

In this example, the device 110 determines that the user's activity is indicative of general interest in the content and that a response/augmentation should be provided based on that identification.

Note that a user may provide preferences or otherwise customize a system with respect to the circumstances or input that will be used to trigger augmentations of video content. In this example, the user 102 does desire to receive augmentations to video content based on gaze input indicative of attention/interest.

An augmentation 555 is provided, which, in this example, is a text bubble that provides information responsive to the user activity. The augmentation includes the text: "This game was played in S Stadium on Feb. 4, 2018" which was identified based on metadata of the video content 145 identifying when the video content was recorded and where it was recorded. The augmentation 555 is positioned based on the location at which the user activity (e.g., pointing) was directed and a linking augmentation 560 is used to graphically associate the augmentation 555 with the element depicted in the depiction 245 of the video content 145.

FIG. 6 is a flowchart representation of an exemplary method 600 that uses user activity determined via a first device to provide augmentations corresponding to video content that is being presented on a second device. In some implementations, the method 600 is performed by a device (e.g., device 110, TV 140, or streaming device 170 of FIG. 1), such as a mobile device, desktop, laptop, or server device. The method 600 can be performed on a device that has a screen for displaying images and/or a screen for viewing stereoscopic images such as a head-mounted display (HMD). In some implementations, the method 600 is performed by processing logic, including hardware, firmware, software, or a combination thereof. In some implementations, the method 600 is performed by a processor executing code stored in a non-transitory computer-readable medium (e.g., a memory).

At block 602, the method 600 determines a location on a surface of a physical environment at which a user activity is directed based on sensor data obtained via a first device. FIGS. 2-5 illustrate using gaze, hand gestures, and verbal phrases to identify a user activity directed at a location on a surface of a physical environment. In some implementations, obtaining the location at which a user activity is directed involves identifying the boundaries or region of a surface corresponding to a display such as a television and identifying a location, e.g., coordinates within the plane of that surface that correspond to a user activity.

The location on the surface at which the user activity is directed may be determined based on determining a gaze direction based on image data of an eye captured by the first device. For example, one or more images of the user's eye may be used to determine a gaze direction within an HMD relative to a display or view provided by the HMD. This gaze direction relative to the display or view may be used to determine at what portion of the HMD's screen or view the user is gazing. The portion of the HMD's screen or view at which the user is gazing may be associated with a portion of a 3D environment depicted or presented via the HMD. This portion of the 3D environment (e.g., a portion of a surface corresponding to a TV screen) may then be associated with a location/portion of a screen/display of a second device at which one or more elements of video content are identified.

The location on the surface at which the user activity is directed may be determined based on determining a hand gesture based on the sensor data captured by the first device. For example, one or more images of the user's hand(s) may be used to determine a pointing or gesturing direction a 3D environment depicted or presented via the device. The pointing or gesturing direction may be used to identify a portion of the 3D environment at which the user's hand is pointing. This portion of the 3D environment (e.g., a portion of a surface corresponding to a TV screen) may then be associated with a location/portion of a screen/display of a second device at which one or more elements of video content are identified.

In another example, the location on the surface is determined based on verbal input, e.g., interpreting a phrase "what is that golfer wearing" to identify that a golfer (in displayed content) is the subject of interest and determining a location of that displayed golfer (e.g., based on gaze data or information about the video content) relative to the surface of the physical environment.

The location on the surface at which the user activity is directed may be determined based on generating a scene understanding based on sensor data captured at the first device. For example, one or more images of the physical environment may be used to identify the types of the objects that are within the physical environment including the location of the surface of the second device's screen or monitor. Obtaining the location on the surface at which the user activity is directed may involve identifying a surface (e.g., a planar surface, flat, curved surface, etc.) in the physical environment, identifying a region on the surface that is a content display area, and identifying the location within the content display area. Such as surface, for example, may correspond to at least a portion of a front or display portion of a television, monitor, or other display. Identifying the surface may involve identifying a flat front portion of a television, monitor or other display. Identifying the surface may involve identifying the curved display surfaces of a curved television or curved monitor. Detection/ identification of a curved display surface can be based on object detection or from device/model identification, which may be provided by the display device, a streaming device, a display controller or otherwise determined.

In some implementations, the surface of the physical environment is identified based on detecting a flat/planar area and an indicator (e.g., a dot pattern displayed in TV content) that indicates the position, screen size, boundaries, or other attributes of where and how the video content is being displayed. In one example, the region on the surface is determined based on recognizing one or more region indicators (e.g., dots) displayed by the second device to identify an attribute (e.g., size, shape, resolution) of the content display area.

At block 604, the method 600 obtains an identification of an element of video content that corresponds to the user activity. This may involve the element being identified as corresponding to the user activity based on data (e.g., metadata) identifying that the element is displayed within the video content at a position at the time of the user activity and the position corresponds to the location on the surface of the physical environment at which the user activity is directed. For example, as illustrated in FIG. 6, block 604 may involve sub-block 606 identifying a position in the video content corresponding to the location at which the user activity is directed and sub-block 608 identifying the element based on the element being displayed within the video content at the position at the time of the user activity.

Data about the video content may be used to facilitate determination of an element of the video content at which a user activity is directed. Such data may be determined automatically or manually when the content was created, for example, by the content creator or a $3^{rd}$ party interested in identifying their elements in the video content. Such data may be determined automatically or manually based on later inspecting the video content, for example, at an inspection server operated by a streaming media provider. The data may identify a make, model, source, location, or attribute of the element. The data may identify when or where a portion of the video content in which the element is provided was recorded. The data for a video content item may come from one or more source including, but not limited to, data generated by a content creator (e.g., film producer) that created the video content, data generated by an element provider (e.g., shoe manufacturer) that produced the element, and data generated by a video content service (e.g., a television streaming service) that streams the video content to the second device.

In some implementations, determining that the element of video content corresponds to the user activity is further based on audio input received at the first device. For example, a verbal phrase "what shoe is golfer X wearing?" may be interpreted to identify that the element of interest in the video content is the shoe(s) of golfer X. Such a determination may be independent of where the user is looking or gesturing.

In the case of a flat, curved surface (e.g., a curved television or monitor), determining that an element of video content corresponds to the user activity may be based on identifying that the element is displayed within the video content at a position at the time of the user activity and the position corresponds to the location on the curved surface at which the user activity is directed. A target position may be identified as in the case of a planar surface, e.g., by identifying an x,y position, and this target position can be adjusted to account for the curvature of the flat, curved surface.

At block 610, in accordance with obtaining the identification of the element of the video content that corresponds to the user activity, an augmentation is presented via the first device or the second device. For example, a TV may have augmented content overlaid on its displayed video content and/or an HMD may display augmentations on or near a depiction of the TV that is visible via the HMD. In some implementations, as illustrated in FIGS. 2-5, the first device may receive data identifying where on the surface the element is displayed and position the augmentation accordingly, e.g., nearby, with an arrow pointing to the element, etc. In some implementations, an HMD provides the augmentation in a view of an XR environment, where the augmentation is positioned within the XR environment based on the location on the surface at which the user activity is directed.

In some implementations, video content is provided to a user who operates an HMD separate from a content viewing device such as a TV. The HMD may be configured to be worn by the user while the user experiences a physical environment that includes the content viewing device while that content viewing device is presenting video content. The HMD may include sensors such as eye gaze tracking, depth sensors, LIDAR, IMU, and other sensors used to determine the HMD's position and user viewpoint relative to the content viewing device. A streaming video service or SVD supporting a shared credential with the HMD may be used to coordinate backend services and data.

In some implementations, the streaming video service annotates the video content to label elements and/or identify the placement of products within scenes with a bounding box or enclosing area along with other details of interest such as actor, location, background, and other scene information.

When an annotated video content item is played on the SVD and the user inquires about a product currently displayed on the screen, the system retrieves the annotation for the products on the screen. The inquiry can be initiated in a voice command, an interaction such as a button click on the HMD or streaming device remote control or otherwise.

The annotated product identifier and bounding area may be available for processing, ideally on the SVD which may have less power constraints than the HMD. The HMD may perform the processing in some circumstances or implementations. A product identifier may be used to retrieve additional information such as product description, price and a deep link URL for purchase and display on one of the devices.

Multiple annotated products may be selected from, e.g., display only one or a few annotations, based on HMD pose or user viewpoint relative to the display screen of the content viewing device (e.g., TV). For example, a particular product from amongst multiple displayed products may be identified based on identifying that the user is looking at or near that product displayed on the content viewing device. In some implementations, an annotation stored in or otherwise associated with a video content item defines a boundary area that can be mapped to the display device to determine one or more products in the user's viewpoint or eye gaze direction.

In some implementations, the HMD does not need to use a relatively high power image sensor and can instead use a relatively low power LIDAR or low resolution depth camera to determine a plane or curved panel upon which the content viewing device (e.g., TV) is displaying video content. In some implementations, an HMD identifies a position (e.g., x/y coordinates within a planar region corresponding to a second device's display) and provides that information to another device (e.g., the second device, a streaming device/set-top box, a separate server, etc.) to perform computation or power intensive processing to identify augmentation content and/or where to position the augmentation content. This can avoid or reduce the HMD having to perform resource expensive computer visions task, such as object detection, to identify the object of interest within the displayed content.

In some implementations, the annotations are specific to a foreign language. For example, a user may watch video content with Spanish language audio content and see augmentations providing English language translations of the Spanish language audio content.

FIG. 7 is a block diagram of an example of the device 700 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 700 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 710, one or more AR/VR displays 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, an ambient light sensor (ALS), one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present the experience to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 712 correspond to diffractive, reflective, polarized, holographic, etc. waveguide displays. For example, the device 110 includes a single display. In another example, the device 110 includes a display for each eye of the user.

In some implementations, the one or more image sensor systems 714 are configured to obtain image data that corresponds to at least a portion of the physical environment 105. For example, the one or more image sensor systems 714 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 714 further include illumination sources that emit light, such as a flash. In various implementations, the one or more image sensor systems 714 further include an oncamera image signal processor (ISP) configured to execute a plurality of processing operations on the image data including at least a portion of the processes and techniques described herein.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium. In some implementations, the memory 720 or the non-transitory computer readable storage medium of the memory 720 stores the following programs, modules and data structures, or a subset thereof including an optional operating system 730 and one or more instruction set(s) 740.

The operating system 730 includes procedures for handling various basic system services and for performing hardware dependent tasks. In some implementations, the instruction set(s) 740 are configured to manage and coordinate one or more experiences for one or more users (e.g., a single experience for one or more users, or multiple experiences for respective groups of one or more users). The instruction set(s) 740 include a content presentation instruction set 742 configured with instructions executable by a processor to provide augmentations to video content. For example, the augmentations may be provided so that they are visible within an XR environment.

Although these elements are shown as residing on a single device (e.g., the device 110), it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., instruction set(s) 740) shown separately in FIG. 7 could be implemented in a single module and the various functions of single functional blocks (e.g., instruction sets) could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a generalpurpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
at an electronic device having a processor:
　determining a location on a surface of a physical environment at which a user activity is directed based on sensor data obtained via a first device; and
　obtaining an identification of an element of video content that corresponds to the user activity, the video content displayed by a second device separate from the first device in the physical environment, wherein the element is identified based on data indicating that the element is displayed within the video content at the time of the user activity and at a position corresponding to the location on the surface of the physical environment at which the user activity is directed; and
　wherein, in accordance with obtaining the identification of the element of the video content that corresponds to the user activity, an augmentation is presented via the first device or the second device.

2. The method of claim 1, wherein the sensor data comprises image data of an eye, and wherein the location on the surface at which the user activity is directed is based on determining a gaze direction based on the image data of an eye.

3. The method of claim 1, wherein determining the location on the surface at which the user activity is directed comprises:
　identifying a surface in the physical environment, wherein the surface is a planar surface or a flat, curved surface;
　identifying a region on the surface that is a content display area; and
　identifying the location within the content display area.

4. The method of claim 1, wherein the element comprises an object displayed within the video content at the position.

5. The method of claim 1, wherein the data identifies a make, model, source, location, or attribute of the element.

6. The method of claim 1, wherein at least a some of the data is generated by a content creator that created the video content, an element provider that produced the element, or a video content service that streams the video content to the second device.

7. The method of claim 1, wherein the second device comprises a television or computer monitor having a display, and wherein the first device is a head-mounted device.

8. The method of claim 7, wherein the head-mounted device provides the augmentation in a view of an extended reality (XR) environment, wherein the augmentation is positioned within the XR environment based on the location on the surface at which the user activity is directed.

9. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

determining a location on a surface of a physical environment at which a user activity is directed based on sensor data obtained via a first device; and obtaining an identification of an element of video content that corresponds to the user activity, the video content displayed by a second device separate from the first device in the physical environment, wherein the element is identified based on data indicating that the element is displayed within the video content at the time of the user activity and at a position corresponding to the location on the surface of the physical environment at which the user activity is directed; and wherein, in accordance with obtaining the identification of the element of the video content that corresponds to the user activity, an augmentation is presented via the first device or the second device.

10. The system of claim 9, wherein the sensor data comprises image data of an eye, and wherein the location on the surface at which the user activity is directed is based on determining a gaze direction based on the image data of an eye.

11. The system of claim 9, wherein determining the location on the surface at which the user activity is directed comprises:

identifying a surface in the physical environment, wherein the surface is a planar surface or a flat, curved surface;

identifying a region on the surface that is a content display area; and identifying the location within the content display area.

12. The system of claim 9, wherein the element comprises an object displayed within the video content at the position.

13. The system of claim 9, wherein the data identifies a make, model, source, location, or attribute of the element.

14. The system of claim 9, wherein at least a some of the data is generated by a content creator that created the video content, an element provider that produced the element, or a video content service that streams the video content to the second device.

15. The system of claim 9, wherein the second device comprises a television or computer monitor having a display, and wherein the first device is a head-mounted device.

16. The system of claim 15, wherein the head-mounted device provides the augmentation in a view of an extended reality (XR) environment, wherein the augmentation is positioned within the XR environment based on the location on the surface at which the user activity is directed.

17. A non-transitory computer-readable storage medium, storing program instructions executable by one or more processors to perform operations comprising:

determining a location on a surface of a physical environment at which a user activity is directed based on sensor data obtained via a first device; and obtaining an identification of an element of video content that corresponds to the user activity, the video content displayed by a second device separate from the first device in the physical environment, wherein the element is identified based on data indicating that the element is displayed within the video content at the time of the user activity and at a position corresponding to the location on the surface of the physical environment at which the user activity is directed; and wherein, in accordance with obtaining the identification of the element of the video content that corresponds to the user activity, an augmentation is presented via the first device or the second device.

18. The non-transitory computer-readable storage medium of claim 17, wherein the sensor data comprises image data of an eye, and wherein the location on the surface at which the user activity is directed is based on determining a gaze direction based on the image data of an eye.

19. The non-transitory computer-readable storage medium of claim 17, wherein determining the location on the surface at which the user activity is directed comprises:

identifying a surface in the physical environment, wherein the surface is a planar surface or a flat, curved surface;

identifying a region on the surface that is a content display area; and identifying the location within the content display area.

20. The non-transitory computer-readable storage medium of claim 17, wherein the element comprises an object displayed within the video content at the position.

21. The non-transitory computer-readable storage medium of claim 17, wherein the data identifies a make, model, source, location, or attribute of the element.

22. The non-transitory computer-readable storage medium of claim 17, wherein at least a some of the data is generated by a content creator that created the video content, an element provider that produced the element, or a video content service that streams the video content to the second device.

23. The non-transitory computer-readable storage medium of claim 17, wherein the second device comprises a television or computer monitor having a display, and wherein the first device is a head-mounted device.

24. The non-transitory computer-readable storage medium of claim 23, wherein the head-mounted device provides the augmentation in a view of an extended reality (XR) environment, wherein the augmentation is positioned within the XR environment based on the location on the surface at which the user activity is directed.

* * * * *